US009703706B2

(12) United States Patent
Bagal et al.

(10) Patent No.: US 9,703,706 B2
(45) Date of Patent: Jul. 11, 2017

(54) UNIVERSAL CACHE MANAGEMENT SYSTEM

(75) Inventors: Prasad V. Bagal, San Jose, CA (US); Rich Long, Woodside, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 234 days.

(21) Appl. No.: 13/037,172

(22) Filed: Feb. 28, 2011

(65) Prior Publication Data

US 2012/0221768 A1 Aug. 30, 2012

(51) Int. Cl.
*G06F 12/0811* (2016.01)
*G06F 12/084* (2016.01)
*G06F 12/0897* (2016.01)
*G06F 17/30* (2006.01)

(52) U.S. Cl.
CPC ........ *G06F 12/0811* (2013.01); *G06F 12/084* (2013.01); *G06F 12/0897* (2013.01); *G06F 17/3048* (2013.01); *G06F 2212/22* (2013.01)

(58) Field of Classification Search
CPC .................................................... G06F 12/128
USPC ................ 711/121, 122, 130, 133, 142, 143, 711/E12.019
See application file for complete search history.

(56) References Cited

U.S. PATENT DOCUMENTS 5,897,634 A * 4/1999 Attaluri et al.
6,078,994 A * 6/2000 Carey ........................... 711/133
6,434,672 B1 8/2002 Gaither
6,557,082 B1 * 4/2003 Josten et al. .................. 711/141
7,581,064 B1 * 8/2009 Zedlewski ............ G06F 12/084
                                                                 711/118
7,822,727 B1 * 10/2010 Shaughnessy ................ 707/703

(Continued)

FOREIGN PATENT DOCUMENTS

KR    10-2010-0131054    * 12/2010    ............. G06F 12/06

OTHER PUBLICATIONS

Xin Liu et al. "CLIC: CLient-Informed Caching for Storage Servers." Feb. 2009. USENIX. FAST '09. pp. 297-310.*

(Continued)

*Primary Examiner* — Nathan Sadler
(74) *Attorney, Agent, or Firm* — Hickman Palermo Becker Bingham LLP

(57) ABSTRACT

Techniques for universal cache management are described. In an example embodiment, a plurality of caches are allocated, in volatile memory of a computing device, to a plurality of data-processing instances, where each one of the plurality of caches is exclusively allocated to a separate one of the plurality of data-processing instances. A common cache is allocated in the volatile memory of the computing device, where the common cache is shared by the plurality of data-processing instances. Each instance of the plurality of data-processing instances is configured to: identify a data block in the particular cache allocated to that instance, where the data block has not been changed since the data block was last persistently written to one or more storage devices; cause the data block to be stored in the common cache; and remove the data block from the particular cache. Data blocks in the common cache are maintained without being persistently written to the one or more storage devices.

38 Claims, 4 Drawing Sheets

(56) References Cited

U.S. PATENT DOCUMENTS

| | | | |
|---|---|---|---|
| 7,840,752 B2* | 11/2010 | Hu et al. ..................... | 711/113 |
| 8,489,820 B1* | 7/2013 | Ellard ......................... | 711/138 |
| 2002/0026448 A1* | 2/2002 | Bird et al. ................. | 707/104.1 |
| 2002/0052914 A1* | 5/2002 | Zalewski et al. ............. | 709/203 |
| 2004/0215883 A1* | 10/2004 | Bamford et al. ............ | 711/129 |
| 2005/0193160 A1 | 9/2005 | Bhatt et al. | |
| 2005/0204112 A1 | 9/2005 | O'Connor et al. | |
| 2005/0223174 A1* | 10/2005 | Mogi ................. | G06F 12/0866 711/129 |
| 2006/0143256 A1* | 6/2006 | Galchev ............... | G06F 12/084 |
| 2006/0248131 A1* | 11/2006 | Marwinski et al. .......... | 707/206 |
| 2009/0164733 A1* | 6/2009 | Kim et al. ................... | 711/133 |
| 2009/0276654 A1* | 11/2009 | Butterworth et al. ............ | 714/1 |
| 2010/0122026 A1* | 5/2010 | Umamageswaran et al. ............................ | 711/113 |
| 2010/0185817 A1* | 7/2010 | Magenheimer ............... | 711/130 |
| 2011/0113036 A1* | 5/2011 | Idicula et al. ................. | 707/747 |
| 2012/0005158 A1* | 1/2012 | Bhatt et al. .................... | 707/609 |

OTHER PUBLICATIONS

Ioannis Koltsidas and Stratis D. Viglas. "The Case for Flash-Aware Multi-Level Caching." 2009. University of Edinburgh. Tech Report EDI-INF-RR-1319.*

Shivakumar Venkatarman. Global Memory Management for Multi-Server Database Systems. 1996. University of Wisconsin—Madison. pp. 24-32.*

Theodore M. Wong and John Wilkes. "My cache or yours? Making storage more exclusive." Jun. 2002. USENIX. FAST '02.*

Sashikanth Chandrasekaran and Roger Bamford. "Shared Cache—The Future of Parallel Databases." Mar. 2003. IEEE. ICDE'03. pp. 840-850.*

Gokul Soundararajan et al. "Dynamic Partitioning of the Cache Hierarchy in Shared Data Centers." Aug. 2008. ACM. PVLDB '08. pp. 635-646.*

John L. Hennessy and David A. Patterson. Computer Architecture: A Quantitative Approach. 2007. Elsevier. $4^{th}$ ed. pp. 287-315.*

Rik van Riel. "Page replacement in Linux 2.4 memory management." Jun. 2001. USENIX. FREENIX 2001.*

Hoyoung Jung et al. "LRU-WSR: Integration of LRU and Write Sequence Reordering for Flash Memory." Aug. 2008. IEEE. IEEE Transactions on Consumer Electronics. vol. 54. pp. 1215-1223.*

Translation of KR 10-2010-0131054.*

"In-the-Lab: Full ESX/vMotion Test Lab in a Box, Part 1." Aug. 2009. https://blog.solori.net/2009/08/17/in-the-lab-full-esxvmotion-test-lab-in-a-box-part-1/.*

"In-the-Lab: Full ESX/vMotion Test Lab in a Box, Part 2." Aug. 2009. https://blog.solori.net/2009/08/19/in-the-lab-full-esxvmotion-test-lab-in-a-box-part-2/.*

Andreas Peetz. "A myth busted and an FAQ: ESXi is *not* based on Linux! But what is it?" Aug. 2013. http://www.vfront.de/2013/08/a-myth-busted-and-faqe-sxi-is-not-based.html.*

European Patent Office, "Written Opinion", in application No. PCT/US212/026639 dated May 6, 2013, 7 pages.

Current Claims in application No. PCT/US212/026639 dated May 2013, 6 pages.

Yadgar et al., "Karma: Know it All Replacement for a Multilevel Cache", dated Jan. 1, 1007, 16 pages.

* cited by examiner

UNIVERSAL CACHE MANAGEMENT SYSTEM

TECHNICAL FIELD

The present disclosure relates to memory management in data-processing systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A Symmetric Multi Processor (SMP) machine, or box, is a multiprocessor computer host in which two or more Central Processing Units (CPUs), or processors, are operatively connected to a single shared physical memory and are controlled by a single Operating System (OS) instance. Typically, large organizations deploy multiple database instances on the same SMP host in order to improve utilization and to reduce the total cost of ownership (TCO). Because of the high TCO of SMP hosts, many organizations would like to additionally achieve clustered scalability from such multi-tenancy deployments of database instances on SMP hosts. Unfortunately, however, clustered multi-tenancy deployments are not widely used because they suffer from an inability to share physical memory among the multiple database instances that run on the same SMP host.

Specifically, clustered scalability is difficult to achieve in multi-tenancy deployments because of an over-provisioning of physical memory. For example, while an SMP host may have 4-8 CPUs that share one or more terabytes of physical memory, in typical deployments there may be twenty or even more database instances that run simultaneously on the SMP host. To address the memory requirements of so many database instances, administrators are typically forced to configure all of the available physical memory of the SMP host among the various database instances. However, when one or some of the database instances start experiencing a heavier workload than the others, it is not possible for the OS instance on the SMP host to allocate more physical memory to these database instances because all of the physical memory of the SMP host has already been provisioned. In order to address this over-provisioning problem, administrators typically have to shut down one or several database instances that are not busy at the time, so that the OS instance on the SMP host can re-provision the released physical memory to the database instances that are experiencing the heavy workloads. Needless to say, this solution is not only inefficient because it involves intervention by administrators, but it also lacks the consolidation desired from the multi-tenancy deployment on the SMP host because when database instances are shut down they are not available for failover and any other availability purposes. Further, under such multi-tenancy deployments, it is clear that the problem of memory over-provisioning is a serious obstacle to achieving real scalability by deploying multiple database instances in one or more clusters.

While the problem of memory over-provisioning is described above with respect to database instances that are deployed on SMP hosts, it is noted that this problem is not unique to SMP hosts or to database instances. Rather, the same memory over-provisioning problem may be experienced in multi-tenancy deployments on smaller commodity server machines for any type of data-processing instances that use a lot of volatile memory to buffer data from persistent storage in order to access and modify the data before writing it back to the persistent storage.

BRIEF DESCRIPTION OF THE DRAWINGS

The techniques described herein are illustrated by way of example, and not by way of limitation, in the figures of the accompanying drawings and in which like reference numerals refer to similar elements and in which.

DETAILED DESCRIPTION

Figure 1:
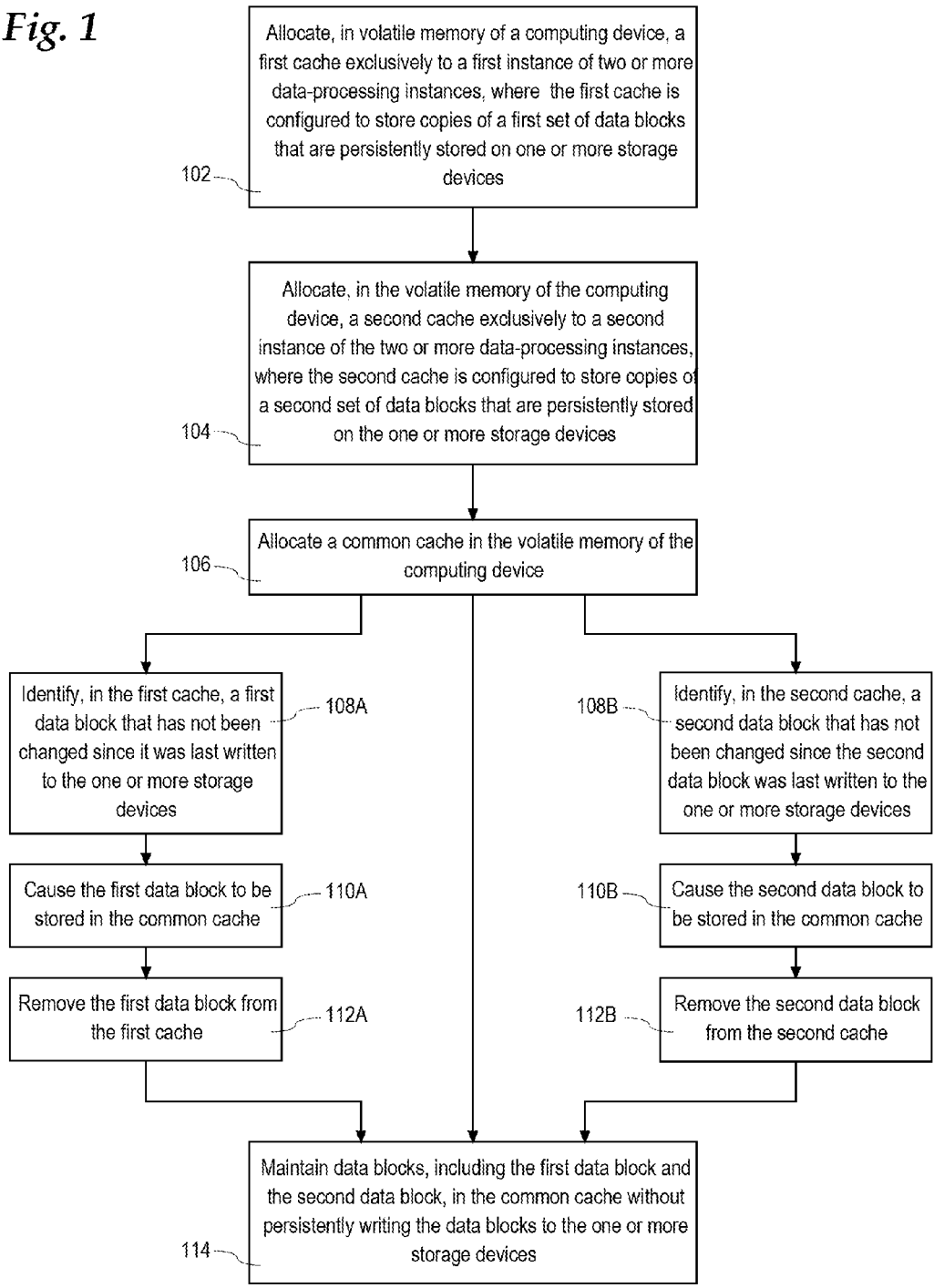
FIG. 1 is a flow diagram that illustrates an example method for cache management according to one embodiment.

In the following description, for the purposes of explanation, numerous specific details are set forth in order to provide a thorough understanding of the described techniques for automatic data placement. It will be apparent, however, that the techniques described herein may be practiced without these specific details. In other instances, well-known structures and devices are shown in block diagram form in order to avoid unnecessarily obscuring the techniques described herein.

General Overview

Techniques for universal cache management are described herein. Each of multiple data-processing instances executing on a computing device is allocated an exclusive, private cache in the volatile memory of the computing device. In such multi-tenancy deployment of data-processing instances on the computing device, each data-processing instance uses its private cache to buffer data items that are persistently stored on one or more persistent storage devices, where the data-processing instance accesses, modifies, and/or otherwise processes the data items in the private cache before persistently writing the data items from the private cache back to the persistent storage device(s).

According to the techniques described herein, a common cache is allocated in the volatile memory of the computing device such that the common cache can be shared by the multiple data-processing instances that run on the computing device. When any given data-processing instance needs space in its private cache to read one or more additional data items from the persistent storage device(s), the data-processing instance identifies for eviction a "clean" data item in its private cache—e.g., such as a data item that has not been modified in the private cache since the data item was last written from the private cache to the persistent storage device(s). Instead of just discarding the clean data item from its private cache, the data-processing instance stores, or causes the clean data item to be stored, in the common cache. After the clean data item has been stored in the common cache, the data-processing instance removes the clean data item from its private cache in order to free up space for storing the additional data item(s) that need to be read from the persistent storage device(s). Thereafter, when the data-processing item needs to read into its private cache the clean data item, the data-processing instance first checks in the common cache to determine whether the clean data item is still stored therein—and if it is, the data-processing instance retrieves the clean data item from the common cache instead of reading it from the persistent storage device(s).

In this way, the common cache effectively serves as a universal cache resource pool that maintains clean data items in volatile memory for multiple data-processing instances. The common cache is effectively shared among all data-processing instances without being exclusively allocated to any one instance; thus, if a particular instance becomes more active, that particular instance will consume more of the common cache than other instances without any availability impact to the other instances—which do not need to be taken down, but at most would need to fetch from the persistent storage device(s) those data items that are not found in the common cache. In this manner, the techniques described herein: (1) avoid the shutting down of data-processing instances in order to re-provision their memory to other, busier instances; (2) avoid the problem of memory over-provisioning and allow data-processing instances on the computing device to be configured in a cluster without having to face frequent memory re-provisioning.

In an example embodiment, the techniques described include a method performed by a computing device that comprises: allocating, in volatile memory of the computing device, a first cache exclusively to a first instance of two or more data-processing instances, where the first cache is configured to store copies of a first set of data blocks that are persistently stored on one or more storage devices; allocating, in the volatile memory of the computing device, a second cache exclusively to a second instance of the two or more data-processing instances, where the second cache is configured to store copies of a second set of data blocks that are persistently stored on the one or more storage devices; allocating a common cache in the volatile memory of the computing device; the first instance performing the steps of: identifying, in the first cache, a first data block that has not been changed since the first data block was last written to the one or more storage devices; causing the first data block to be stored in the common cache; removing the first data block from the first cache; the second instance performing the steps of: identifying, in the second cache, a second data block that has not been changed since the second data block was last written to the one or more storage devices; causing the second data block to be stored in the common cache; removing the second data block from the second cache; and maintaining data blocks, including the first data block and the second data block, in the common cache without persistently writing the data blocks to the one or more storage devices.

In another example embodiment, the techniques described herein may be implemented as a method performed by a computing device that comprises: allocating, in volatile memory of the computing device, a plurality of caches to a plurality of database instances, where each one of the plurality of caches is exclusively allocated to a separate one of the plurality of database instances; allocating, in the volatile memory of the computing device, a common cache that is shared by the plurality of database instances; each particular database instance performing the steps of: identifying a particular data block in a particular cache, of the plurality of caches, that is exclusively allocated to the particular database instance, where the particular data block has not been changed in the particular cache since the particular data block was last persistently written to one or more storage devices; causing the particular data block to be stored in the common cache; removing the particular data block from the particular cache; and maintaining data blocks, including the particular data block, in the common cache without persistently writing the data blocks to the one or more storage devices.

In various other embodiments, the techniques described herein may be implemented as one or more computer program products in the form of sequences of executable instructions that are stored on one or more computer-readable storage media, and/or as one or more systems that are configured to perform the methods described above.

Functional Description of an Example Embodiment

FIG. 1 is a flow diagram that illustrates an example method for universal cache management in accordance with the techniques described herein. In some embodiments, the steps of the method illustrated in FIG. 1 are performed by one or more processes that are executing on a computing device as part of one or more data-processing instances. As used herein, "instance" refers to an allocated chunk of memory and a set of one or more processes, associated with that chunk of memory, that are allocated computational resources such as memory, CPU time, and/or disk storage space in order to perform one or more functionalities. An example of a process that may be included in an instance is a "server" (also referred to herein as a "server process") that is configured to respond to requests from various clients and applications for one or more services and/or functionalities.

As used herein, "data-processing instance" refers to an instance that is allocated an exclusive cache in the volatile memory of a computing device for buffering data blocks that are persistently stored on one or more storage devices, where the data-processing instance accesses, modifies, and/or otherwise processes the data blocks in its exclusive cache before persistently writing the data blocks from its exclusive cache back to the storage device(s). As used herein, "exclusive" or "private" cache refers to a cache that is accessible by only one data-processing instance and that cannot be accessed by, or shared with, other data-processing instances. Examples of data-processing instances include without limitation database instances that manage data in one or more databases, multimedia server instances that manage various types of multimedia such as images, audio/video streams, and other streamed multimedia content, internet server instances that cache content that is persistently stored elsewhere, application server instances and other types of middleware server instances that cache data to service particular types of clients and applications, and any other types of instances that are configured to process persistently stored data by buffering it into a volatile memory cache.

As used herein, "data block" refers to a unit (e.g., such as a data structure) that is allocated in persistent storage to store a portion of data that is managed by a data-processing instance. It is noted that, as used herein, a data block is a unit of data that is persistently stored on one or more storage device(s) and that survives restarts of the data-processing instance; thus, a data block is different from the various dynamic and static configuration parameters of the data-processing instance and from the various run-time attributes, variables, handles, and other process context information that is maintained by the data-processing instance in the volatile memory of the computing device during the instance's run-time operation.

The method illustrated in FIG. 1 is described hereinafter as being performed by one or more instances (or processes thereof) such as an OS instance and/or data-processing instances. However, it is noted that this description is for illustrative purposes only and the method of FIG. 1 is not limited to being performed by any particular type of instance or computer process.

In step 102, a first cache is exclusively allocated in the volatile memory of a computing device to a first instance of two or more data-processing instances that are executing on the computing device. The first cache is configured to store copies of a set of data blocks that are persistently stored on one or more storage devices. For example, in some implementations, an OS instance on the computing device may allocate a portion (e.g., such as a range of memory addresses) of volatile memory to the first data-processing instance. Then, the software component from which the first instance is instantiated and/or a process in the first instance may allocate this portion of memory among the first cache and the processes that comprise the first instance. In another example, the OS instance on the computing device may perform the actual allocation of memory to the first cache and to each of the processes included in the first data-processing instance. Thus, the techniques described herein are not limited to having a specific type of a component that allocates memory for the exclusive cache of the first data-processing instance.

In a similar manner, in step 104 a second cache is exclusively allocated in the volatile memory of the same computing device to a second instance of the two or more data-processing instances that are executing on the computing device. The second cache is configured to store copies of a set of data blocks that are persistently stored on one or more storage devices, where this set of data blocks may be the same or different than the set of data blocks which are processed by the first data-processing instance.

In step 106, a common cache is allocated in the volatile memory of the computing device. The common cache is allocated in such manner that at least some (and possibly all) of the two or more data-processing instances running on the computing device can share the common cache by storing clean data blocks therein. According to the techniques described herein, the common cache may be allocated by various types of processes and instances. For example, in some implementations, the common cache may be allocated as a shared range of memory addresses by the OS instance that executes on the computing device. In other implementations, the OS instance may allocate a portion of memory to a common cache instance. Then, the software component from which the common cache instance is instantiated and/or a process in the common cache instance may allocate this portion of memory among the common cache and the processes that comprise the common cache instance.

According to the techniques described herein, in various embodiments and implementations the common cache may be allocated in the physical memory of the computing device, on flash memory card(s) that are attached to the computing device, and/or in a combination of the physical memory and the flash memory card(s) of the computing device such that a portion of the common cache resides in the physical memory and a spill-over portion resides on the flash memory card(s)

In step 108A, the first instance of the two or more data-processing instances identifies a clean first data block in the first cache, which is exclusively allocated to the first instance. As used herein, "clean" data block refers to a data block stored in a cache, where the data block that has not been modified in the cache since the data block was last written (or flushed) from the cache to persistent storage.

In step 110A, the first instance causes the identified clean data block to be stored in the common cache. For example, in some implementations the first instance or a process thereof stores the clean data block in the common cache; in other implementations, the first instance or a process thereof sends the clean data block to a common cache instance that manages the common cache, and the common cache instance or a process thereof stores the clean data block in the common cache and returns an acknowledgement to the first instance.

After the clean data block is stored in the common cache, in step 112A the first instance or a process thereof removes (or "purges") the clean data block from the first cache allocated to the first instance without writing the clean data block to the storage device(s). For example, the first instance or the process thereof may remove the clean data block in order to free space for storing another data block that needs to be read from the storage device(s) into the first cache.

The second data-processing instance processes its clean data blocks in a similar manner—e.g., instead of just discarding clean data blocks in order to free space in its exclusive cache, the second instance first causes its clean data blocks to be stored in the common cache. For example, in step 108B, the second instance or a process thereof identifies a clean second data block in the second cache, which is exclusively allocated to the second instance. Then, in step 110B, the second instance or the process thereof causes the identified clean data block to be stored in the common cache, for example by storing the clean data block directly into the common cache or by sending the clean data block to the common cache instance that manages the common cache. After the clean data block is stored in the common cache, in step 112B the second data-processing instance or a process thereof removes the clean data block from its exclusive cache without flushing the clean data block to the storage device(s).

According to the techniques described herein, in step 114 the data blocks in the common cache are maintained without being written (or flushed) back to the storage device(s) where the data blocks are persistently stored. For example, when space needs to be freed in the common cache, a process that manages the common cache can use various cache management mechanisms to identify and page out data blocks from the common cache, where such cache mechanisms may include, without limitation, Least Recently Used (LRU) mechanisms, Most Recently Used (MRU) mechanisms, Least Frequently Used (LFU) mechanisms, touch-up mechanisms, and/or various combinations and modifications thereof. According to the techniques described herein, the instance and/or the process(es) that manage the common cache do not modify or otherwise change the contents of the data blocks stored in the common cache and, since the data blocks in the common cache are clean, does not need to persistently write these data blocks back to the storage device(s).

When a data-processing instance (e.g., such as the first instance or the second instance) of the two or more data-processing instances needs to read a data block into its exclusive cache, the data-processing instance first checks to determine whether the data block in question is stored in the common cache. If the data block in question is stored in the common cache, then the data-processing instance reads or causes the data block to be read from the common cache instead of the storage device(s), thereby saving one or more Input/Output (I/O) operations to the storage device(s). If the data block in question is not stored in the common cache (either because the data block has not yet been stored in the common cache or has been paged out from there), the data-processing instance causes the data block to be retrieved from the storage device(s). In some implementations, causing the data block to be retrieved from the storage device(s) involves the data-processing instance itself fetching the data block from the storage device(s). In other implementations, in response to a cache miss for the data block in the common cache, an instance that manages the common cache retrieves the data block from the storage device(s) and returns it to the data-processing instance. In operational contexts that use a cluster of common caches, in response to a cache miss the instance that manages the local common cache can fetch the data block from another cache in the common cache cluster instead of retrieving the data block from the storage device(s).

In this manner, the techniques for universal cache management described herein avoid the problem of memory over-provisioning in multi-tenancy deployments. In addition, the use of the common cache as described herein allows data-processing instances on the same computing device to be configured in scalable cluster(s) without memory re-provisioning issues, while at the same time providing support for various availability functions (e.g., such as instant failover, mission-critical level of performance, etc.) that may be required of the particular multi-tenancy deployment.

Block-Identifying Data

According to the techniques described herein, block-identifying data is maintained for data blocks that are stored in a common cache that is allocated in the volatile memory of a computing device and is shared by multiple data-processing. As used herein, "block-identifying data" refers to one or more values that identify data blocks that are stored in the common cache. In various embodiments, the block-identifying data may include various types of identifiers and may be maintained by various entities in various types of data structures.

For example, in various embodiments the block-indentifying data for a given data block may include, without limitation, any suitable block identifier(s) such as: a system-wide block identifier that uniquely identifies the data block; a combination of one or more storage identifiers (e.g., such as disk ID, file ID, etc) and one or more block identifiers (e.g., such as a block ID, file offset, etc.), where the combination uniquely identifies the data block to any of the data-processing instances that share the common cache on a computing device; one or more version identifiers that indicate whether a data block is current or not, where the version identifier(s) may be associated specifically with the individual data block or with a set of data blocks that are modified at the same time or in the same transaction; and any other types of block identifiers and/or combination of block identifiers that are suitable to identify data blocks to data-processing instances that execute on a computing device.

In various embodiments the block-identifying data, for data blocks stored in the common cache on a computing device, may be maintained in any suitable types of data structures that may be allocated in the volatile memory of the computing device and/or in some combination of volatile memory and persistent storage. For example, in some embodiments the block-identifying data may be maintained in a data directory or other suitable data repository that is maintained in the volatile memory of the computing device that hosts the common cache. In other embodiments, the block-identifying data may be maintained both in the common cache and in the private caches of the data-processing instances that share the common cache. For example, in these embodiments an instance, which manages the common cache, may assign a unique block ID to each data block as the data block is stored in the common cache and may return this block ID to the data-processing instance that caused the data block to be stored in the common cache; upon receipt of this block ID, the data-processing instance associates or maps this block ID to other block-identifying data it maintains for the data block and uses this block ID to request the data block from the common cache. It is noted that the techniques described herein are not limited to any particular type of storage for storing block-identifying data, and thus the examples described herein are to be regarded in an illustrative rather than a restrictive sense.

In various embodiments, various types of instances and processes may be used to maintain the block-identifying data for data blocks that are accessed by multiple data-processing instances that share a common cache on the same computing device. For example, in some embodiments the block-identifying data may be maintained by an instance or a process thereof that is dedicated on the computing device to tracking data blocks for the data-processing instances and the common cache. In other embodiments, the block-identifying data may be maintained by both the instance that manages the common cache and the data-processing instances that store data blocks in the common cache. In yet other embodiments in which the common caches on multiple computing devices are configured in a cluster, a distributed cluster-ware process(es) may be used to maintain the block-identifying data for all data blocks that can be stored in any of the common caches that are configured in the cluster. It is noted that the techniques described herein are not limited to using a particular type of instance or process to maintain block-identifying data, and thus the examples described herein are to be regarded in an illustrative rather than a restrictive sense.

Example Operational Context

An example embodiment of the techniques for universal cache management described herein may be implemented for multiple database instances that are deployed on the same computing device.

As used herein, "database instance" refers to an instance that manages a database. "Database" refers to a collection of data that is stored on one or more persistent storage devices. In various embodiments and implementations, the collection of data comprising a database may be stored on the persistent storage device(s) as one or more data files that store the data of various database objects, one or more log files that store log data necessary to maintain consistent transaction processing and recovery, and one or more control and configuration files that store the control and configuration data associated with the database.

In the context of database instances, a data block is an atomic unit (e.g., such as a data structure) that is allocated in persistent storage to store one or more data rows (and/or portions thereof) that include data associated with one or more database objects of a database. In some embodiments, all data blocks processed by a database instance may have the same fixed size; in other embodiments, the data blocks processed by a database instance may have variable sizes. In various embodiments, the database instance is typically configured to write and read data to and from volatile memory in units no smaller than data blocks. For example, when the database instance needs to access the data in a particular data row or a group of data rows, the database instance or a process thereof determines the data block(s) which physically store the particular data row or the group of data rows, copies these data blocks(s) from the persistent storage into the private memory cache of the database instance if these data block(s) are not already in the cache, and accesses the data in the particular data row or the group of data rows in the copies of the data block(s) that are stored in the private memory cache. The database instance or a process thereof may use various memory management mechanisms to flush any modified (also referred to as "dirty") data blocks from the private memory cache to the persistent storage.

In various embodiments and implementations, the data blocks which store the data of a given database may be logically organized in various storage space structures (e.g., such as extents, segments, tablespaces, etc.) and may be physically allocated as raw hard disk blocks or as portions of Operating System (OS) data files. For example, the data of a database (e.g., such as relational or object-relational database) is logically organized in database objects (sometimes also referred to as "schema objects") that may include, but are not limited to, tables, views, sequences, stored procedures, indexes, and database links to other databases. Physically, the data of a database is stored on persistent storage device(s) in data blocks, where in various embodiments and implementations such data blocks may be physically stored as raw disk blocks directly on the persistent storage device(s) or may be stored in files that are stored on the persistent stored device(s). Depending on the number and data types of the data values that are stored in the data rows, a particular data block may store the data values from a single data row or may store the data values from multiple data rows, where the multiple data rows may logically belong to the same database object or to multiple different database objects. As an example, the data of a relational table may be logically organized in records, where each record includes one or more fields for storing data values from the corresponding one or more columns that are configured for the table. Physically, the data values in each data record may be stored as a data row in one or more data blocks that are stored in a file on a persistent storage device such as a hard disk. For example, in a relational table that stores employee data in three columns named "ID", "first_ name", and "last_name", a particular data row can store values for an employee ID, a first name, and a last name for a particular employee.

In a multi-tenancy deployment, the same database may be accessed by multiple database instances that are configured as a cluster on one or more computing devices. In such multi-tenancy deployment, it is not uncommon to configure several (5, 10, even 20) database instances to run on the same computing device, which is typically an SMP machine (or host). A conventional approach to address the memory requirements in such multi-tenancy deployment is for administrators to allocate a small portion of volatile memory to the private buffer cache of each database instance, and to allocate the rest of the volatile memory of the SMP host to the file buffer cache that is managed by the OS instance on the SMP host. The OS instance on the SMP host uses the file buffer cache to cache file blocks from files that are stored in one or more file systems managed by the OS instance and that are accessed via I/O system calls by the database instances and by other processes that run on the SMP host.

The main disadvantage of this conventional approach is that the OS instance treats the file blocks in the file buffer cache as opaque data. For example, while the OS instance or an I/O process thereof may keep some minimal metadata so that it can provide read and write access to the file blocks in the file buffer cache, the OS instance or the I/O process thereof does not know and does not keep track of how the database instances use the file blocks in the file buffer cache. Rather, the OS instance associates each file block in the file buffer cache with the OS-process ID of the database instance process that placed the file block in the file buffer cache. This effectively prevents a database instance from accessing a file block that has been placed in the file buffer cache by a different database instance. In addition, when a database instance process dies, for correctness reasons all file blocks placed by that process in the file buffer cache are purged—the OS I/O process writes these file blocks to disk if they are dirty or just throws them out if they are clean. The reason for this is that the OS instance cannot guarantee that when a process restarts it will be assigned the same process ID; hence, for correctness reasons, the OS instance must purge from the file buffer cache any file blocks that have been placed there by a process that has died. In practical terms, this means that when a database instance restarts, it will not find in the file buffer cache any file blocks that have been placed there by the database instance processes.

To address these and other problems of multi-tenancy deployments of database instances (e.g., such as memory over-provisioning problems, limited scalability, and restricted availability), the techniques described herein provide for allocating and managing a common cache on the computing device at a layer above the OS instance, where block-identifying data is maintained for data blocks stored in the common cache in order to provide visibility into the use of the data blocks by the multiple database instances that share the common cache.

Figure 2:
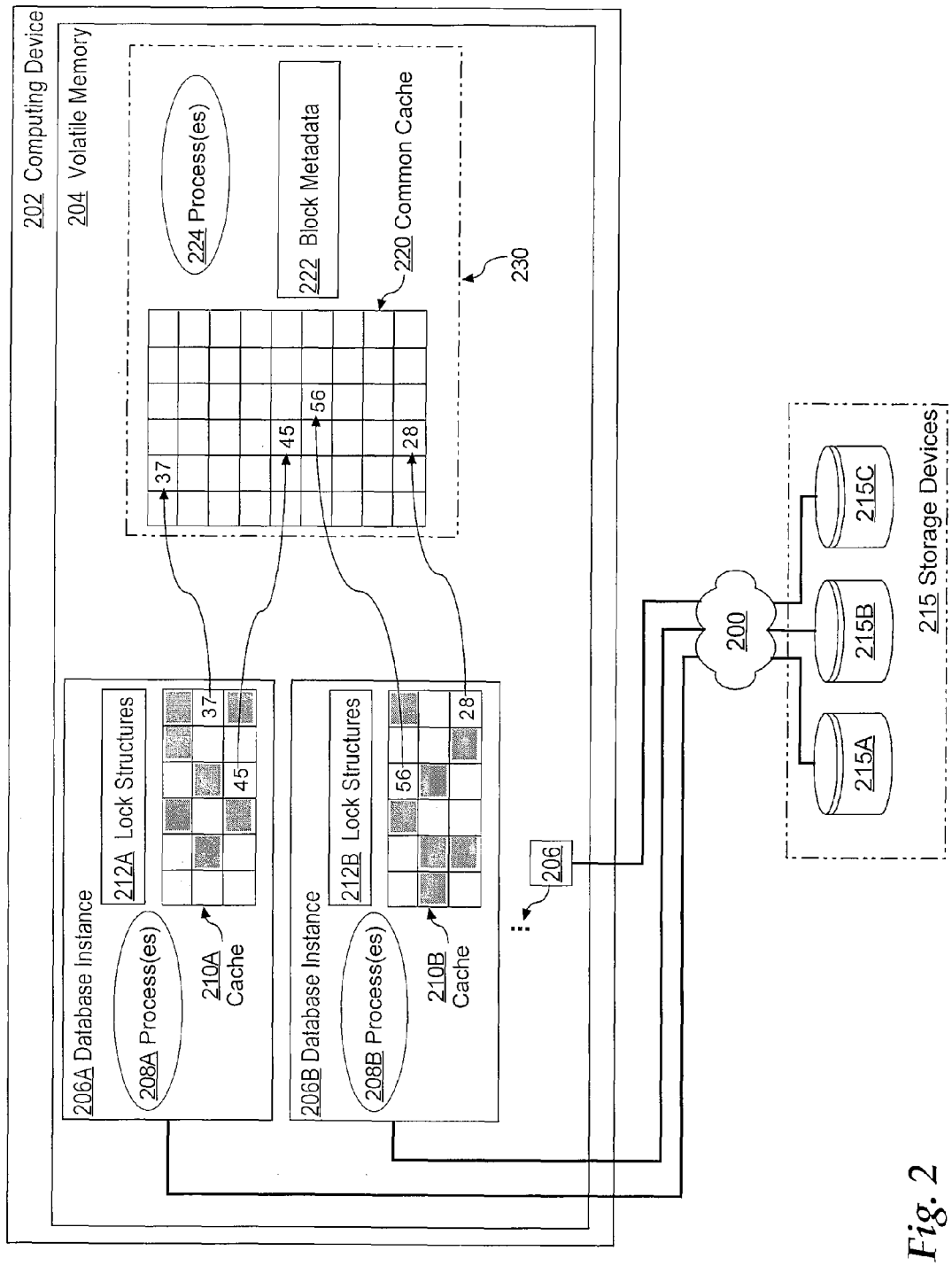
FIG. 2 is a block diagram that illustrates an example operational context according to one embodiment.

FIG. 2 is a block diagram that illustrates an example operational context according to one embodiment. Computing device 202 is communicatively connected to storage devices 215 over network 200. Storage devices 215 include one or more non-volatile storage medium devices such optical or magnetic disks 215A, 215B, and 215C. Network 200 may be a storage area network (SAN) or network area storage (NAS) that includes one or more network infrastructure elements (e.g., such as bridges, switches, routers, etc.) that are configured to transfer disk-level and/or file-level data between computing devices and storage devices.

Computing device 202 is a computer system that is configured to execute an OS instance (not shown in FIG. 2). Depending on the particular deployment, a computing device may be a separate machine host or a blade thereof that is configured with various hardware components such as processors (CPUs), memory, storage controller(s), network interface card(s), etc. As illustrated in FIG. 2, computing device 202 comprises volatile memory 204. Volatile memory 204 may include physical memory, flash memory on one or more flash memory cards that are attached to computing device 202, and/or a combination thereof.

Multiple database instances 206 are configured to execute on computing device 202. Database instances 206 manage one or more databases that are stored across network 200 on storage devices 215. Each of database instances 206 comprises a chunk (or portion) of volatile memory 204 and a set of one or more processes that are allocated computational resources such as memory, CPU time, and/or disk storage space in order to perform one or more functionalities. For example, the set of processes included in each of database instances 206 may include, without limitation, one or more database writer processes, one or more log writer processes, one or more checkpoint processes, and one or more database server processes. (It is noted that in a different implementation, the functionalities performed by the database writer process(es), the log writer process(es), the checkpoint process(es), and the database server process(es) may be performed by a single, possibly multi-threaded process that is collectively referred to as a database server.)

A database writer process is configured to flush "dirty" data blocks from the private cache of the database instance to the data files on the persistent storage device(s) that store the data of the database managed by the database instance. A log writer process is configured to write to log files on the persistent storage device(s) redo and/or undo information that is used to maintain consistent transaction processing and recovery of the database managed by the database instance. A checkpoint process is configured to write to the log files and/or the data files a checkpoint, which is a data structure that stores a system change number (SCN) which indicates that all changes made to data blocks prior to recording the checkpoint have been written to the persistent storage device(s).

A database server process (or a "database server") is allocated computational resources such as memory and CPU time in order to perform one or more functionalities such as data management functions (including, but not limited to, reading data blocks from the persistent storage device(s) into the private cache of the database instance, processing requests and queries by clients and applications to perform various operations and transactions that read, insert, delete, and modify data in the data blocks stored in the private cache of the database instance), as well as database management functions (including, but not limited to, processing queries and requests to create databases and tables, to allocate disk space for databases and tables, and/or to create and maintain user login information, role information, and security policy information).

As illustrated in FIG. 2, database instance 206A is allocated a portion of volatile memory 204 for its exclusive private cache 210A. Database instance 206A includes process(es) 208A such as, for example, one or more database writer processes, one or more log writer processes, one or more checkpoint processes, and one or more database server processes. One or more of process(es) 208A maintains lock structures 212A in the volatile memory allocated to database instance 206A, where for each data block stored in private cache 210A lock structures 212A include a lock structure that is used to control access to that data block in cache 210A.

Similarly, database instance 206B is allocated a portion of volatile memory 204 for its exclusive private cache 210B. Database instance 206B includes process(es) 208B such as, for example, database writer process(es), log writer process(es), checkpoint process(es), and database server process(es). One or more of process(es) 208B maintains lock structures 212B in the volatile memory allocated to database instance 206B, where for each data block stored in private cache 210B lock structures 212B include a lock structure that is used to control access to that data block in cache 210B.

According to the techniques for universal cache management described herein, a portion of volatile memory 204 is allocated to common cache 220. A portion of volatile memory 204 is also allocated to block metadata 222, which stores block-identifying data for the data blocks stored in common cache 220. One or more processes 224 are allocated memory and other computing resources (e.g., CPU time) to manage common cache 220 and block metadata 222. As illustrated in FIG. 2, a single instance 230 may be instantiated from a software component stored in a computer-readable storage medium where, when executed, the software component may allocate memory to, and otherwise configure, common cache 220, block metadata 222, and process(es) 224. It is noted, however, that in different embodiments and implementations, the common cache and block metadata may be managed by one or more processes that are initialized for different instances that each performs different functionalities. Thus, the use of a single instance 230 in the operational context of FIG. 2 is to be regarded in an illustrative rather than a restrictive sense.

In the operational context of FIG. 2, instance 230 may be a storage management instance which manages common cache 230 in addition to performing storage volume management for database instances 206 that are configured to execute on computing device 202. For storage volume management, when a database instance wants to create a new data file to store data for a given database, the database instance requests from instance 230 to create the data file on a group of disks. From the perspective of instance 230, the data file is a logical address space that is allocated to data blocks that store data for the database. Instance 230 maps the logical address space of the data file to physical storage areas on the different disks in the disk group—e.g., the data file may have a total of 100 MB of storage space that is mapped to 100 chunks of 1 MB, where each chink is stored on a particular disk of the disk group. After creating and mapping the data file in this manner, instance 230 returns an extent map to the database instance, where the extent map describes the mapping from the logical address space of the data file to the physical storage areas on the disks in the disk group. Thus, when the database instance wants to persistently store a data block on disk, the database instance determines the logical address of the data block within the data file, uses the extent map to translate this logical address into the physical disk address on the corresponding disk (e.g., such as "disk1", offset 500), and writes the data block to the location on the disk that is pointed to by that physical disk address.

According to the techniques described herein, instance 230 or a process thereof may manage common cache 220 by organizing the volatile memory allocated to the common cache into a memory group that is mapped to a range of memory addresses, where the data blocks from database instances 206 are stored at different offsets within that range. Since the data blocks stored in common cache 220 are always clean, instance 230 can maintain common cache 220 without persistently writing data blocks from the common cache to storage devices 215 and without allowing any modifications to be made to the data in the data blocks while the data blocks are stored in the common cache. Further, instance 230 may use any known cache management mechanism (e.g., such LRU, MRU, LFU, etc.) to determine and discard (or page out) data blocks from common cache 230 when a database instance needs space in the common cache to store a data block.

In operation, database instance 206A stores in its private cache 210A copies of the data blocks for the database (not shown in FIG. 2) that is managed by the database instance. (It is noted that in FIG. 2, the shaded areas in caches 210A and 210B represent "dirty" data blocks that have been modified in these caches since the last time these data blocks have been written to storage devices 215.) When database instance 206A needs to free up space in cache 210A, according to the techniques described herein the database instance or a process thereof first identifies a clean data block that can be removed from cache 210A, where the clean data block has not been modified in cache 210A since it was last written to storage devices 215. Database instance 206A or the process thereof may use any suitable cache management mechanism to select clean data blocks that can be removed from cache; it is noted, however, that according to the techniques described herein dirty data blocks are not selected for removal. As illustrated in FIG. 2, clean data blocks 45 and 37 may be selected in this manner for removal from cache 210A. (It is noted that in FIG. 2, the block identifiers "45", "37", "56", "28", etc., are used for illustration purposes only; in a real implementation, the data blocks may be identified in any suitable manner—e.g., such as using a combination of a file ID and block ID or file offset).

After selecting a data block, e.g., such as data block 45, for removal, database instance 206A or a process thereof retrieves the lock incarnation number for this data block from the lock structure 212A corresponding to this data block. The lock incarnation number for a data block is a value that is incremented each time the data block is modified; thus, the lock incarnation number for a data block effectively indicates whether the copy of the data block associated with that lock incarnation number is the most current or not. After retrieving the lock incarnation number for the selected data block 45, database instance 206A sends this data block and its lock incarnation number to instance 230. Instance 230 or a process thereof writes data block 45 into common cache 220. As part of the write operation, instance 230 or the process thereof also records the lock incarnation number for data block 45 into the block metadata 222 that is associated with that data block. Upon successfully committing the write operation for data block 45, instance 230 or the process thereof returns to database instance 206A a common cache ID for data block 45. The common cache ID for data block 45 uniquely identifies, within common cache 220, data block 45 and the lock incarnation number thereof that was recorded in block metadata 222. Upon receiving the common cache ID for data block 45, database instance 206A or a process thereof records the common cache ID into the lock structure 212A that is associated with data block 45 and then removes data block 45 from private cache 210A. It is noted that database instance 206A keeps the lock structure 212A for data block 45 in memory even though data block 45 has been removed from private cache 210A.

At a later point in time, when database instance 206A needs access to the data in data block 45, the database instance or a process thereof first check to determine whether the data block is stored in common cache 220. To do this, database instance 206A or a process thereof retrieves the common cache ID and the lock incarnation number from the lock structure 212A that is associated with data block 45, and sends the retrieved common cache ID and lock incarnation number to instance 230. Instance 230 or a process thereof uses the common cache ID and the lock incarnation number to determine whether a data block associated with these values is stored in common cache 220. If it is determined that the common cache stores a data block that is associated with the received common cache ID and with the received (or a higher) lock incarnation number, then instance 230 or the process thereof retrieves this data block from common cache 220 and returns it to database instance 206A. If it is determined that common cache 220 does not store a data block that is associated with the received common cache ID, or if the received lock incarnation number indicates that the data block stored in common cache 220 is old, then instance 230 or the process thereof returns a cache miss indication to database instance 206A and discards from common cache 220 the data block that is associated with the received common cache ID and with the old lock incarnation number. Upon receipt of a cache miss indication from instance 230, database instance 206A or a process thereof proceeds to read the requested data block (data block 45) from storage devices 215.

According to the techniques described herein, all of database instances 206 process data blocks that are stored in their corresponding private caches in the same manner as described above. For example, database instance 206A processes data block 37 in the same manner as it processed data block 45. In another example, database instance 206B processes data blocks 56 and 28 in the same manner as database instance 206A processed data block 45. This ensures that multiple database instances can use common cache 220 as a shared memory pool that stores clean data blocks. In addition, this allows a database instance to retrieve from common cache 220 data blocks that are stored there by a different database instance. For example, suppose that database instances 206A and 206B are configured to manage the same database. In this operational scenario, when database instance 206A needs access to data in data block 56, database instance 206A or a process thereof can retrieve data block 56 from common cache 220 instead of retrieving this data block from storage devices 215.

Different embodiments of the techniques described herein may use different types of information to ensure that an old version or copy of a data block is not going to be returned from the common cache. As described heretofore, a database instance keeps a lock incarnation number in the lock structure for a data block even after the data block is removed from the private cache of the database instance, where the lock incarnation number is typically flushed to disk along with the data block. This ensures that if a different database instance (that manages the same database on the same or a different computing device) retrieves the same data block from the persistent storage device(s) and modifies it, a different (e.g., higher) lock incarnation number will be associated with the most current copy of the data block, thereby preventing the common cache (or the process that manages it) from returning to the first database instance the old copy of the data block that is stored in the common cache.

In some embodiments, in addition to a common cache ID that identifies a data block that has been successfully committed to the common cache, the process managing the common cache may return to a database instance a system change number (SCN) that is associated with the data block. The SCN for a database is incremented and recorded in persistent storage in response to a checkpoint, and indicates that all changes made to data blocks of the database prior to recording the checkpoint have been written to the persistent storage. Since the sequence of SCNs for a given database is known to the database instance(s) that manage that database, by associating a copy of a data block stored in the common cache with the current SCN for the database, the process managing the common cache ensures that a database instance will not be sent an old copy of a data block from the common cache.

In the above manner, the techniques described herein address various problems (e.g., such as memory over-provisioning problems, limited scalability, and restricted availability, etc.) that arise in the context of multi-tenancy deployments of database instances on the same computing device or host. Specifically, the techniques described herein allow administrators to instantiate or otherwise configure each database instance on the computing device with a private buffer cache that is just big enough to hold the maximum anticipated number of dirty data blocks, which avoids the problem of over-provisioning volatile memory when multiple database instances are deployed on the same computing device. The rest of the volatile memory on the computing device (likely a big chunk if the computing device is an SMP host) is allocated to the common cache. In this manner, a database instance would have enough space in its private cache for its own dirty data blocks, while its clean data blocks will be kept in the common cache. The technical effect of this would be that the common resource in contention (the volatile memory on the computing device) is effectively and dynamically shared among all database instances that execute on the computing device. If a particular database instance becomes more active and experiences a heavier workload, then this particular database instance will consume more of the common cache without causing any adverse availability impact to the other database instances—which do not need to be taken down by the administrators, but at most would need to fetch data blocks from the persistent storage for the period of time when the particular database instance is experiencing the heavier workload. In addition, by allowing multiple database instances to dynamically use variable chunks of the volatile memory of the computing device based on workload, the techniques described herein allow the database instances to be deployed as a cluster that is truly scalable.

Use Case: Integrating Multiple Common Caches into a Cluster

In some operational contexts, the techniques for universal cache management described herein provide for integrating, into a cluster, multiple common caches that are allocated on multiple computing devices. In an example embodiment in such operational context, in response to receiving a request for a data block and failing to find the data block in its common cache, a process managing the common cache determines whether another common cache in the cluster stores the data block and, if so, requests the data block from the other common cache. The technical effect of this would be a common cache cluster that can be very large in size, which greatly increases the chances that at any given time any given database instance, which is configured to store data blocks in any given common cache of the cluster, will be able to find a data block it needs in at least one of the common caches comprising the cluster, thereby obviating the need to perform I/O operations to fetch this data block from persistent storage.

Figure 3:
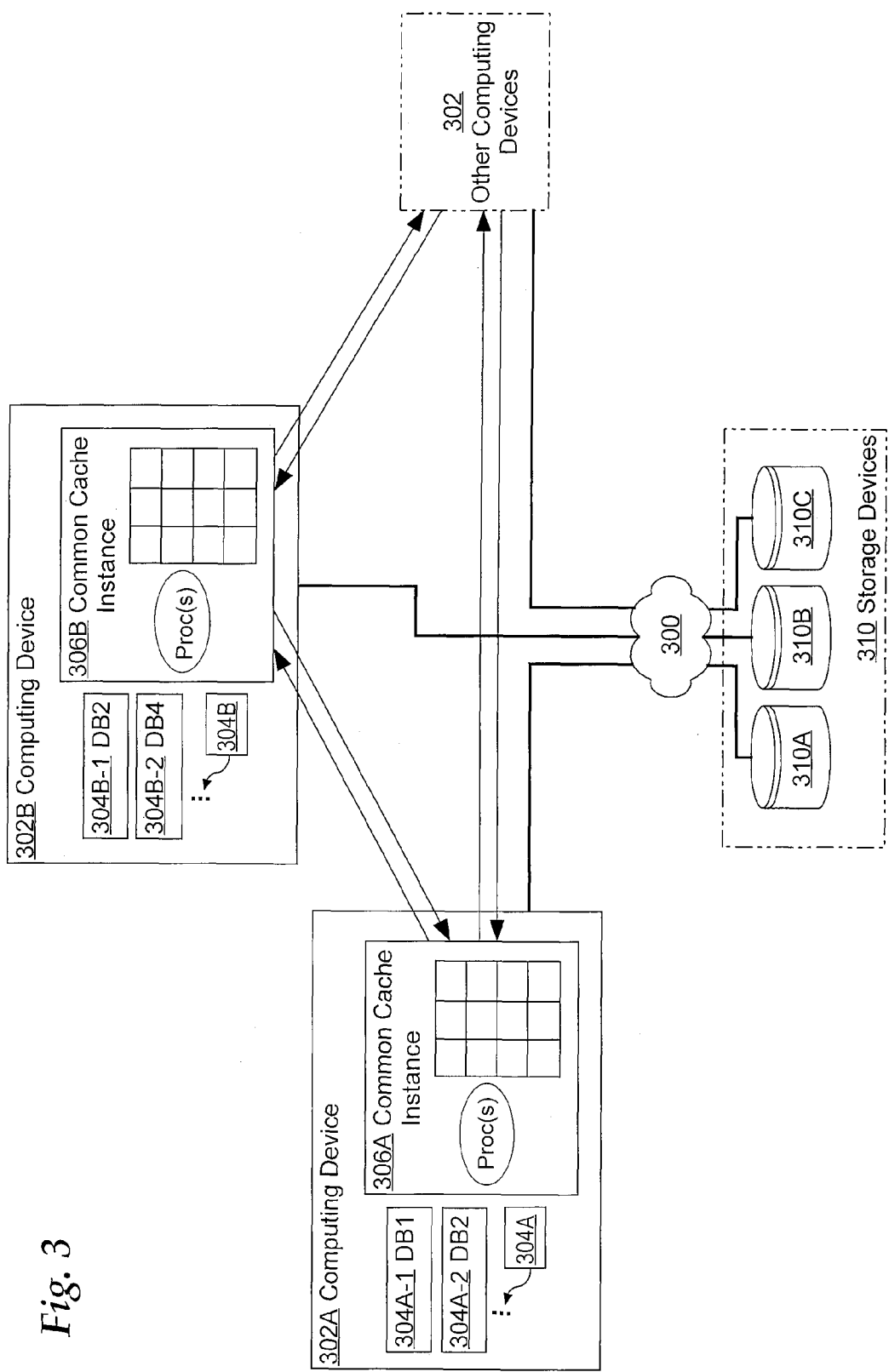
FIG. 3 is a block diagram that illustrates another example operational context according to one embodiment.

FIG. 3 is a block diagram that illustrates an example embodiment according to such operational context. Computing devices 302 are communicatively connected over a network (not shown in FIG. 3). Each of computing devices 302 may be a separate machine host or a blade thereof that is configured with various hardware components such as processors (CPUs), memory, storage controller(s), network interface card(s), etc.

According to the techniques described herein, each of computing devices 302 comprises one or more database instances and a common cache instance, where the common cache instance includes a portion of volatile memory allocated to a common cache and a set of one or more processes that are configured to manage the common cache. For example, computing device 302A comprises database instances 304A and common cache instance 306A, and computing device 302B comprises database instances 304B and common cache instance 306B.

At least some of the database instances executing on different computing devices manage the same database and are communicatively connected over a SAN or a NAS network to storage device(s) that store the data comprising this database. For example, as illustrated in FIG. 3, database instance 304A-2 (on computing device 304A) and database instance 304B-1 (on computing device 304B) manage the same database "DB2". The data comprising database "DB2" is stored across network 300 on storage devices 310 that comprise disks 310A, 310B, and 310C. It is noted that in FIG. 3, other database instances such as database instance 304A-1 (on computing device 304A) and database instance 304B-2 (on computing device 304B) may be configured to manage databases whose data is also stored across network 300 on storage devices 310 or on other storage devices that are connected to network 300.

According to the techniques described herein, the common caches managed by the common cache instances on computing devices 302 are organized to operate in a cluster. Each of the common cache instances in the cluster includes one or more processes that are configured to request data blocks from other common cache instances in the cluster and to send data blocks to the other common cache instances in response to requests therefrom.

As an operational example, consider a scenario where database instance 304A-2 on computing device 304A needs to retrieve into its private cache a particular data block (e.g., such as a data block 43 from data file 2). Database instance 304A-2 sends a request for this data block to its local common cache instance 306A. Common cache instance 306A searches the common cache allocated on computing device 302A and determines that the requested data block (e.g., data block 43 from data file 2) is not stored therein. Instead of returning a cache miss indication to database instance 304A-2, common cache instance 306A sends a request for this data block to another common cache instance in the cluster. For example, in some implementations common cache instance 306A may send a broadcast request to all computing devices which run a database instance that manages the same database ("DB2") as database instance 304A-2; in other implementations, common cache instance 306A may query a cluster-wide data directory to determine which common cache instance in the cluster stores the requested data block. Suppose that common cache instance 306B on computing device 302B stores in its common cache the requested data block (e.g., data block 43 from data file 2) because database instance 304B-1 (which manages the same database "DB2") has placed it there. In response to the request from common cache instance 306A, common cache instance 306B retrieves the requested data block from its common cache and sends the data block to common cache instance 306A. In response to receiving the requested data block, common cache instance 306A may perform some validity checks to determine whether the received data block is the most current copy of the data block and, if so, may return the data block to database instance 304A-2 that requested it. (It is noted that based on the particular implementation, common cache 306A may or may not store the received data block in its common cache; one reason for not storing it may be based on an anticipation that the database instance will soon modify the data block, thereby obviating the need to keep the soon-to-be-dirty data block in the common cache.) In this manner, database instance 304A-2 succeeds in obtaining the data block it needs (e.g., data block 43 from data file 2) without performing any I/O operations to retrieve the data block from storage devices 310.

Various embodiments may use various data transfer mechanisms that are suitable for transferring data blocks between multiple common cache instances that are configured in a cluster. Based on the particular deployment characteristics, such data transfer mechanisms may be deployed over one or more networks to which the computing devices running the common cache instances are connected, over point-to-point bi-directional links between the computing devices, and/or over any other suitable connectivity paradigm that allows for inter-process communications.

In some embodiments, the common cache instances in the cluster may maintain a global data directory which indicates which data blocks are stored in which common caches. For example, each of the common cache instances may include one or more processes that are tasked with maintaining, in a distributed global directory, a current mapping that maps data block identifier(s) to the common cache instances which currently store the data block(s) identified by these data block identifier(s). In addition, in these embodiments the common cache instances may use a global mapping that maps each data block stored in a common cache to a unique cluster-wide ID, where the common cache instances may propagate to each other any newly assigned unique cluster-wide IDs and use the unique cluster-wide IDs to request data blocks from each other.

In some deployments, the use of a common cache cluster in accordance with the techniques described herein provides for better availability than would be possible by using conventional approaches. For example, a computing device may be designated as the primary host for a given database, e.g., database "DB1", and may be designated as the secondary host for one or more other databases, e.g., databases "DB2", "DB3", etc. On this computing device, the database instance managing database "DB1" may be allocated a bigger chunk of the volatile memory of the computing device for its private cache, while the database instances that manage the other databases (e.g., databases "DB2", "DB3", etc.) may be allocated smaller chunks of volatile memory for their private caches. The technical effect of this type of deployment would be that, for each database, a database instance on a primary host will have a bigger private cache to store data blocks from that database, while one or more database instances on one or more secondary hosts will have smaller private caches for storing data blocks from that database. Since according to the techniques described herein a common cache on the primary host will store clean data blocks from the database and since the common caches on the primary host and secondary host(s) of the database are integrated into a cluster, the availability of the database is increased because when the database instance on the primary host fails over to a database instance on a secondary host, the common cache instance on the secondary host can fetch the clean data blocks for the database from the common cache on the primary host without the need to perform expensive I/O operations and without the need to re-provision memory from other instances that run on the secondary host.

By providing for integration of multiple common caches on multiple computing devices into a cluster, the techniques described herein allow for achieving linear scalability of database instances on a large scale. In addition, the techniques described herein allow for more flexible deployments that provide for better availability by using a deployment scheme in which a database instance on a computing device, which is designated as a primary host for a given database, is configured differently than one or more other database instances on one or more other computing devices, which are designated as secondary hosts for the given database.

Use Case: Warming Up the Private Cache Upon Instance Restart

In some operational contexts, the techniques for universal cache management described herein provide for efficient warm-up of the private cache of a database instance when the database instances restarts.

According to the techniques described herein, a common cache on a computing device is configured to keep data blocks in the common cache across restarts of the database instances that placed these data blocks into the common cache. The instance or processes thereof that manage the common cache can preserve the data blocks across database instance restarts because block-identifying data for the data blocks is also maintained in the common cache, thereby providing higher visibility of the block usage by the database instances. Thus, when a database instance restarts, the database instance can retrieve from the common cache into its private cache the clean and current data blocks that were previously placed into the common cache. The technical effect of this would be that the restarting database instance will reach a normal operating state a lot faster than would be possible if the restarting database instance populates its private cache in a conventional way (which involves retrieving a data block from persistent storage only when access to the data in the data block is requested by a client or an application) because the restarting database instance will not need to perform computationally expensive I/O operations to fetch data blocks from the persistent storage.

For example, in some embodiments an instance or a process thereof that manages the common cache maintains, for each data block stored in the common cache, a lock incarnation number and/or a SCN that is associated with that data block by the database instance that uses the block. Since the lock incarnation number and/or the SCN are persistent attributes that are stored on persistent storage (as opposed to run-time attributes, such as an OS process ID, that change each time a database instance is restarted), the instance managing the common cache has a greater visibility into the usage of the data block by the database instance. Thus, when the database instance restarts, the database instance knows what lock incarnation numbers and/or SCN to expect, and as a result the database instance can retrieve those data blocks from the common cache that have the expected lock incarnation numbers and/or SCN, thereby ensuring that "expired" copies of data blocks will not be read into the private cache of the database instance upon restart.

Further, this ability of a restarting database instance to warm-up its private cache by reading data blocks from the common cache is very useful in reducing the downtime that is incurred when the database instances in a cluster need to undergo a software upgrade. In a typical cluster deployment, software upgrades are a difficult and time-consuming task. A typical software upgrade of a cluster involves upgrading database instances and/or processes and services thereof across all nodes in the cluster and restarting these instances and/or processes and services thereof. For a distributed system in which the private caches of many database instances collectively sum to a large size, this means that after a software upgrade this large-sized collective cache needs to be warmed up in order to provide full availability of database instance cluster in a short time. Clearly, by using the conventional way to populate private caches, each database instance in the cluster needs to individually warm up its private cache before being able to take on its expected full workload. However, according to the techniques described herein, the downtimes caused by software upgrades are much shorter because each database instance in the cluster can warm-up its private cache by reading data blocks from its local common cache (and/or from the common cache cluster, if the common caches in the distributed system are configured as a cluster) because the local cache (and/or the common cache cluster) is likely to store most of the data blocks that are needed by each individual database instance to assume its full workload.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be SMP machines, server computer systems, desktop or portable computer systems, network infrastructure devices, or any other device (e.g., such as a blade) that incorporates hard-wired and/or program logic to implement the techniques.

Figure 4:
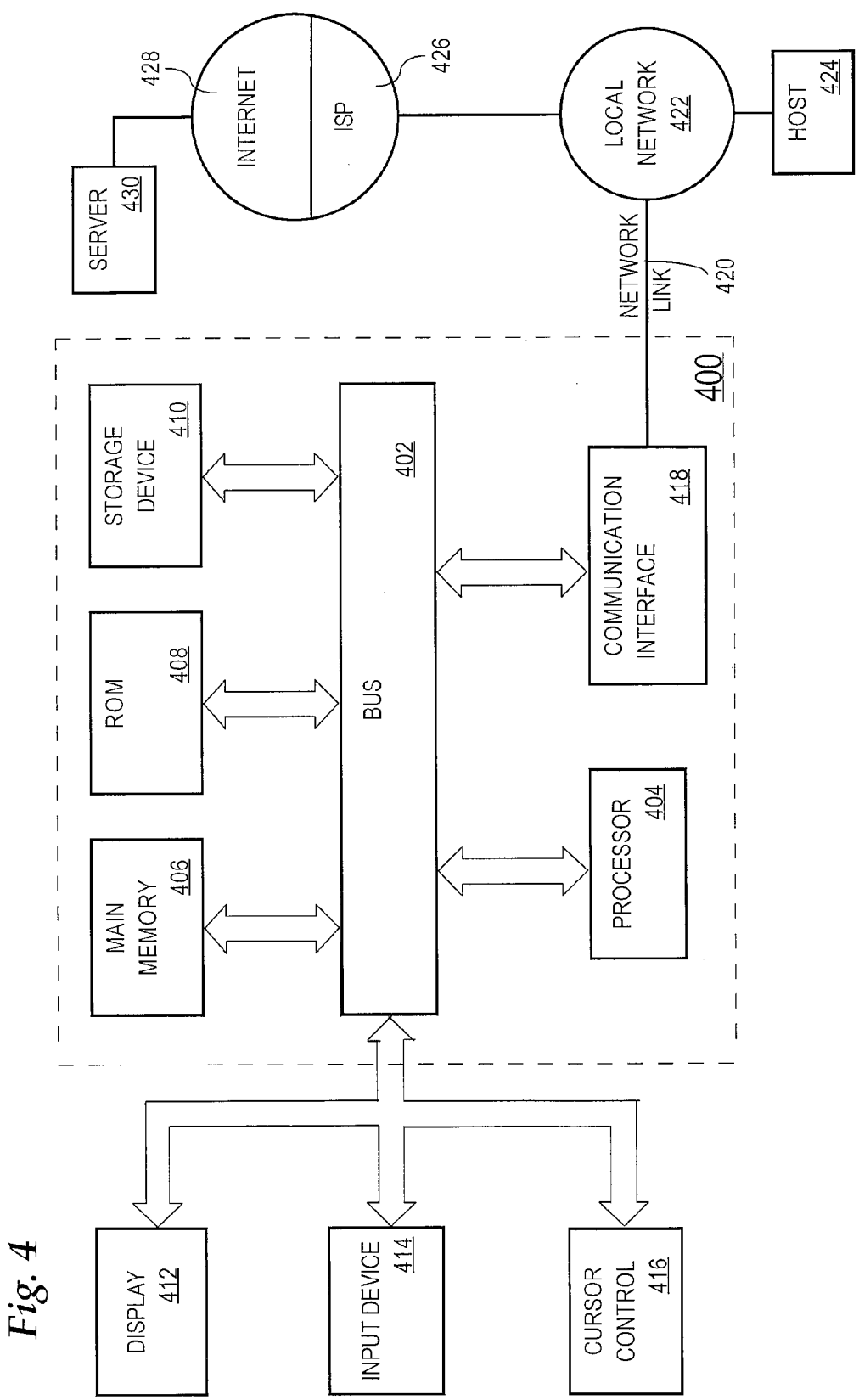
FIG. 4 is a block diagram that illustrates an example computing device on which embodiments may be implemented.

For example, FIG. 4 is a block diagram that illustrates a computer system 400 upon which an embodiment of the techniques described herein may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device (e.g., such as flash memory card), coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques for universal cache management described herein by using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406, flash memory, and/or a combination thereof. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422.

For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   allocating, in volatile memory of a Symmetric Multi Processor (SMP) machine, a first cache exclusively to a first instance of two or more data-processing instances, wherein the first cache is configured to store copies of a first set of data blocks that are persistently stored on one or more storage devices, and wherein the allocating the first cache is performed, at least in part, by an operating system (OS) instance;
   allocating, in the same volatile memory of the SMP machine, a second cache exclusively to a second instance of the two or more data-processing instances, wherein the second cache is configured to store copies of a second set of data blocks that are persistently stored on the one or more storage devices, and wherein the allocating the second cache is performed, at least in part, by the OS instance;
   allocating at least a portion of a common cache in the same volatile memory of the SMP machine, wherein the allocating at least a portion of the common cache is performed, at least in part, by the OS instance;
   the first instance performing the steps of:
      identifying for eviction from the first cache a first data block at least because the first data block has not been changed since the first data block was last persistently written to the one or more storage devices;
      in response to identifying for eviction from the first cache a first data block at least because the first data block has not been changed since the first data block was last persistently written to the one or more storage devices:
         causing the first data block to be stored in the common cache, and
         removing the first data block from the first cache;
   the second instance performing the steps of:
      identifying for eviction from the second cache a second data block at least because the second data block has not been changed since the second data block was last persistently written to the one or more storage devices:
      in response to identifying for eviction from the second cache a second data block at least because the second data block has not been changed since the second data block was last persistently written to the one or more storage devices:
         causing the second data block to be stored in the common cache, and
         removing the second data block from the second cache;
   maintaining data blocks, including the first data block and the second data block, in the common cache without persistently writing the data blocks to the one or more storage devices; and
   wherein the method is performed by the SMP machine.

2. The method of claim 1, wherein the two or more data-processing instances are two or more database instances that manage one or more databases that are stored on the one or more storage devices.

3. The method of claim 1, wherein allocating at least a portion of the common cache comprises one or more of:
   allocating the common cache in physical memory of the SMP machine; and
   allocating a first portion of the common cache on the physical memory of the SMP machine and a second portion of the common cache on a flash memory that is attached to the SMP machine.

4. The method of claim 1, wherein maintaining the data blocks in the common cache comprises maintaining block-identifying data for each of the data blocks stored in the common cache.

5. The method of claim 1, wherein maintaining the data blocks in the common cache comprises:
   maintaining the first data block in the common cache across a restart of the first instance; and
   maintaining the second data block in the common cache across a restart of the second instance.

6. The method of claim 1, further comprising:
   in response to a first request for data from the first data block, the first instance retrieving the first data block from the common cache instead of the one or more storage devices, and storing the first data block back into the first cache;
   in response to a second request for data from the second data block, the second instance retrieving the second data block from the common cache instead of the one or more storage devices, and storing the second data block back into the second cache.

7. The method of claim 1, further comprising:
in response to a request for data from the second data block, the first instance retrieving the second data block from the common cache instead of the one or more storage devices, and storing the second data block into the first cache.

8. The method of claim 1, further comprising:
the first instance sending a request for a third data block to an instance that manages the common cache;
the instance that manages the common cache performing the steps of:
  determining that the third data block is not stored in the common cache;
  retrieving the third data block from a different common cache that is allocated on a different SMP machine; and
  returning the third data block to the first instance.

9. The method of claim 1, further comprising:
the first instance requesting the first data block from the common cache;
determining that the first data block is not stored in the common cache; and
retrieving the first data block from the one or more storage devices, wherein retrieving the first data block comprises one of:
  the first instance retrieving the first data block from the one or more storage devices; or
  an instance that manages the common cache retrieving the first data block from the one or more storage devices and returning the first data block to the first instance.

10. The method of claim 1, further comprising:
after the first instance restarts, the first instance warming up the first cache by retrieving at least the first data block from the common cache instead of the one or more storage devices and storing the first data block back into the first cache; and
after the second instance restarts, the second instance warming up the second cache by retrieving at least the second data block from the common cache instead of the one or more storage devices and storing the second data block back into the second cache.

11. The method of claim 1, wherein the common cache comprises a third set of clean data blocks that are persistently stored on one or more storage devices, and wherein each particular clean data block of the third set of clean data blocks not been changed since the particular clean data block was last persistently written to the one or more storage devices.

12. The method of claim 1, wherein allocating the first cache comprises:
allocating, by the OS instance, a first range of memory addresses to the first instance;
allocating, by the first instance, a subset of the first range of memory addresses to the first cache; and
wherein allocating the second cache comprises:
allocating, by the OS instance, a second range of memory addresses to the second instance;
allocating, by the second instance, a subset of the second range of memory addresses to the second cache.

13. The method of claim 1, wherein allocating the first cache comprises allocating, by the OS instance, a first range of memory addresses to the first cache and wherein allocating the second cache comprises allocating, by the OS instance, a second range of memory addresses to the second cache.

14. A method comprising:
allocating, in volatile memory of a computing device, a plurality of caches to a plurality of database instances, wherein each one of the plurality of caches is exclusively allocated to a separate database instance of said plurality of database instances to change data blocks stored in said each one of said plurality of caches that are modified by a transaction, wherein the allocating the plurality of caches to a plurality of database instances is performed, at least in part, by an operating system (OS) instance;
allocating, in the same volatile memory of the computing device, at least a portion of a common cache that is shared by the plurality of database instances, wherein the allocating at least a portion of the common cache is performed, at least in part, by the OS instance;
each particular database instance, of the plurality of database instances, performing the steps of:
  identifying a particular data block for eviction from a particular cache, of the plurality of caches, that is exclusively allocated to the particular database instance, wherein the particular data block is identified for said eviction at least because the particular data block has not been changed in the particular cache since the particular data block was last persistently written to one or more storage devices;
  in response to identifying a particular data block for eviction from a particular cache, of the plurality of caches, that is exclusively allocated to the particular database instance:
    causing the particular data block to be stored in the common cache, and
    removing the particular data block from the particular cache;
maintaining data blocks, including the particular data block, in the common cache without persistently writing the data blocks to the one or more storage devices;
wherein the method is performed by the computing device.

15. The method of claim 14, wherein:
the particular database instance causing the particular data block to be stored in the common cache comprises one of:
  the particular database instance storing the particular data block in the common cache; or
  the particular database instance sending the particular data block to an instance that manages the common cache.

16. The method of claim 14, wherein:
the particular database instance causing the particular data block to be stored in the common cache comprises sending the particular data block to an instance that manages the common cache; and
the instance that manages the common cache performing the steps of:
  storing the particular data block in the common cache;
  assigning a particular identifier to the particular data block, wherein the particular identifier uniquely identifies the particular data block in the common cache;
  returning the particular identifier to the particular database instance.

17. The method of claim 16, further comprising the particular database instance storing the particular identifier in a particular lock structure that is associated with the particular data block.

18. The method of claim 16, further comprising:
the particular database instance retrieving the particular data block from the common cache and storing the particular data block back into the particular cache, wherein retrieving the particular data block includes sending the particular identifier to the instance that manages the common cache.

19. The method of claim 14, wherein the common cache comprises a set of clean data blocks that are persistently stored on one or more storage devices, and wherein each particular clean data block of the set of clean data blocks not been changed since the particular clean data block was last persistently written to the one or more storage devices.

20. A non-transitory computer-readable storage medium storing one or more sequences of instructions which, when executed by one or more processors, cause:
allocating, in volatile memory of a Symmetric Multi Processor (SMP) machine, a first cache exclusively to a first instance of two or more data-processing instances, wherein the first cache is configured to store copies of a first set of data blocks that are persistently stored on one or more storage devices, and wherein the one or more sequences of instructions for allocating the first cache are performed, at least in part, by an operating system (OS) instance running on the one or more processors;
allocating, in the same volatile memory of the SMP machine, a second cache exclusively to a second instance of the two or more data-processing instances, wherein the second cache is configured to store copies of a second set of data blocks that are persistently stored on the one or more storage devices, and wherein the one or more sequences of instructions for allocating the second cache are performed, at least in part, by the OS instance;
allocating at least a portion of a common cache in the same volatile memory of the SMP machine, wherein the one or more sequences of instructions for allocating at least a portion of the common cache are performed, at least in part, by the OS instance;
the first instance performing the steps of:
identifying for eviction from the first cache a first data block at least because the first data block has not been changed since the first data block was last persistently written to the one or more storage devices;
in response to identifying for eviction from the first cache a first data block at least because the first data block has not been changed since the first data block was last persistently written to the one or more storage devices:
causing the first data block to be stored in the common cache, and
removing the first data block from the first cache;
the second instance performing the steps of:
identifying for eviction from the second cache a second data block at least because the second data block has not been changed since the second data block was last persistently written to the one or more storage devices:
in response to identifying for eviction from the second cache a second data block at least because the second data block has not been changed since the second data block was last persistently written to the one or more storage devices:
causing the second data block to be stored in the common cache, and
removing the second data block from the second cache; and
maintaining data blocks, including the first data block and the second data block, in the common cache without persistently writing the data blocks to the one or more storage devices.

21. The non-transitory computer-readable storage medium of claim 20, wherein the two or more data-processing instances are two or more database instances that manage one or more databases that are stored on the one or more storage devices.

22. The non-transitory computer-readable storage medium of claim 20, wherein allocating at least a portion of the common cache comprises one or more of:
allocating the common cache in physical memory of the SMP machine; and
allocating a first portion of the common cache on the physical memory of the SMP machine and a second portion of the common cache on a flash memory that is attached to the SMP machine.

23. The non-transitory computer-readable storage medium of claim 20, wherein maintaining the data blocks in the common cache comprises maintaining block-identifying data for each of the data blocks stored in the common cache.

24. The non-transitory computer-readable storage medium of claim 20, wherein maintaining the data blocks in the common cache comprises:
maintaining the first data block in the common cache across a restart of the first instance; and
maintaining the second data block in the common cache across a restart of the second instance.

25. The non-transitory computer-readable storage medium of claim 20, wherein the one or more sequences of instructions include instructions that, when executed by one or more processors, cause:
in response to a first request for data from the first data block, the first instance retrieving the first data block from the common cache instead of the one or more storage devices, and storing the first data block back into the first cache;
in response to a second request for data from the second data block, the second instance retrieving the second data block from the common cache instead of the one or more storage devices, and storing the second data block back into the second cache.

26. The non-transitory computer-readable storage medium of claim 20, wherein the one or more sequences of instructions include instructions that, when executed by one or more processors, cause:
in response to a request for data from the second data block, the first instance retrieving the second data block from the common cache instead of the one or more storage devices, and storing the second data block into the first cache.

27. The non-transitory computer-readable storage medium of claim 20, wherein the one or more sequences of instructions include instructions that, when executed by one or more processors, cause:
the first instance sending a request for a third data block to an instance that manages the common cache;
the instance that manages the common cache performing the steps of:
determining that the third data block is not stored in the common cache;

retrieving the third data block from a different common cache that is allocated on a different SMP machine; and returning the third data block to the first instance.

28. The non-transitory computer-readable storage medium of claim 20, wherein the one or more sequences of instructions include instructions that, when executed by one or more processors, cause:
the first instance requesting the first data block from the common cache;
determining that the first data block is not stored in the common cache; and
retrieving the first data block from the one or more storage devices, wherein retrieving the first data block comprises one of:
the first instance retrieving the first data block from the one or more storage devices; or
an instance that manages the common cache retrieving the first data block from the one or more storage devices and returning the first data block to the first instance.

29. The non-transitory computer-readable storage medium of claim 20, wherein the one or more sequences of instructions include instructions that, when executed by one or more processors, cause:
after the first instance restarts, the first instance warming up the first cache by retrieving at least the first data block from the common cache instead of the one or more storage devices and storing the first data block back into the first cache; and
after the second instance restarts, the second instance warming up the second cache by retrieving at least the second data block from the common cache instead of the one or more storage devices and storing the second data block back into the second cache.

30. The non-transitory computer-readable storage medium of claim 20, wherein the common cache comprises a third set of clean data blocks that are persistently stored on one or more storage devices, and wherein each particular clean data block of the third set of clean data blocks not been changed since the particular clean data block was last persistently written to the one or more storage devices.

31. The non-transitory computer-readable storage medium of claim 20, wherein allocating the first cache comprises:
allocating, by the OS instance, a first range of memory addresses to the first instance;
allocating, by the first instance, a subset of the first range of memory addresses to the first cache; and
wherein allocating the second cache comprises:
allocating, by the OS instance, a second range of memory addresses to the second instance;
allocating, by the second instance, a subset of the second range of memory addresses to the second cache.

32. The non-transitory computer-readable storage medium of claim 20, wherein allocating the first cache comprises allocating, by the OS instance, a first range of memory addresses to the first cache and wherein allocating the second cache comprises allocating, by the OS instance, a second range of memory addresses to the second cache.

33. A non-transitory computer-readable storage medium storing one or more sequences of instructions which, when executed by one or more processors, cause:
allocating, in volatile memory of a computing device, a plurality of caches to a plurality of database instances, wherein each one of the plurality of caches is exclusively allocated to a separate database instance of said plurality of database instances to change data blocks stored in said each one of said plurality of caches that are modified by a transaction, and wherein the one or more sequences of instructions for allocating the plurality of caches are performed, at least in part, by an operating system (OS) instance running on the one or more processors;
allocating, in the same volatile memory of the computing device, at least a portion of a common cache that is shared by the plurality of database instances, and wherein the one or more sequences of instructions for allocating at least a portion of the common cache are performed, at least in part, by the operating system;
each particular database instance, of the plurality of database instances, performing the steps of:
identifying a particular data block for eviction from a particular cache, of the plurality of caches, that is exclusively allocated to the particular database instance, wherein the particular data block is identified for said eviction at least because the particular data block has not been changed in the particular cache since the particular data block was last persistently written to one or more storage devices;
in response to identifying a particular data block for eviction from a particular cache, of the plurality of caches, that is exclusively allocated to the particular database instance:
causing the particular data block to be stored in the common cache, and
removing the particular data block from the particular cache; and
maintaining data blocks, including the particular data block, in the common cache without persistently writing the data blocks to the one or more storage devices.

34. The non-transitory computer-readable storage medium of claim 33, wherein:
the particular database instance causing the particular data block to be stored in the common cache comprises one of:
the particular database instance storing the particular data block in the common cache; or
the particular database instance sending the particular data block to an instance that manages the common cache.

35. The non-transitory computer-readable storage medium of claim 33, wherein:
the particular database instance causing the particular data block to be stored in the common cache comprises sending the particular data block to an instance that manages the common cache; and
the instance that manages the common cache performing the steps of:
storing the particular data block in the common cache;
assigning a particular identifier to the particular data block, wherein the particular identifier uniquely identifies the particular data block in the common cache;
returning the particular identifier to the particular database instance.

36. The non-transitory computer-readable storage medium of claim 35, the instructions further comprising instructions for the particular database instance storing the particular identifier in a particular lock structure that is associated with the particular data block.

37. The non-transitory computer-readable storage medium of claim 36, the instructions further comprising instructions for:

the particular database instance retrieving the particular data block from the common cache and storing the particular data block back into the particular cache, wherein retrieving the particular data block includes sending the particular identifier to the instance that manages the common cache.

38. The non-transitory computer-readable storage medium of claim 33, wherein the common cache comprises a set of clean data blocks that are persistently stored on one or more storage devices, and wherein each particular clean data block of the set of clean data blocks not been changed since the particular clean data block was last persistently written to the one or more storage devices.

\* \* \* \* \*

UNITED STATES PATENT AND TRADEMARK OFFICE
CERTIFICATE OF CORRECTION

| | | |
|---|---|---|
| PATENT NO. | : 9,703,706 B2 | Page 1 of 1 |
| APPLICATION NO. | : 13/037172 | |
| DATED | : July 11, 2017 | |
| INVENTOR(S) | : Bagal et al. | |

It is certified that error appears in the above-identified patent and that said Letters Patent is hereby corrected as shown below:

On the Title Page

In Column 2, item (56) under Other Publications, Line 1, delete "CLient" and insert -- Client --, therefor.

In the Specification

In Column 5, Line 62, after "card(s)" insert -- . --.

In Column 7, Lines 41-42, delete "indentifying" and insert -- identifying --, therefor.

Signed and Sealed this
Twentieth Day of February, 2018

Andrei Iancu
*Director of the United States Patent and Trademark Office*